United States Patent
Glassman et al.

(10) Patent No.: US 8,814,694 B2
(45) Date of Patent: *Aug. 26, 2014

(54) METHODS AND APPARATUSES FOR DISPLAYING INTERACTIVE CONTENT THROUGH A DEVICE

(75) Inventors: Ellen Glassman, Closter, NJ (US); David Farrage, Cliffside Park, NJ (US); Yumiko Takagi, Upper Saddle River, NJ (US); Michelle Koza, San Francisco, CA (US); Paul Feinberg, Rivere Vale, NJ (US)

(73) Assignees: Sony Corporation, Tokyo (JP); Sony Electronics Inc., Parkridge, NJ (US)

( * ) Notice: Subject to any disclaimer, the term of this patent is extended or adjusted under 35 U.S.C. 154(b) by 48 days.

This patent is subject to a terminal disclaimer.

(21) Appl. No.: 13/137,637

(22) Filed: Aug. 31, 2011

(65) Prior Publication Data
US 2011/0319161 A1 Dec. 29, 2011

Related U.S. Application Data

(63) Continuation of application No. 10/803,560, filed on Mar. 17, 2004, now Pat. No. 8,057,306.

(60) Provisional application No. 60/455,625, filed on Mar. 17, 2003.

(51) Int. Cl.
*A63F 13/00* (2014.01)
*G07F 17/16* (2006.01)
*H04N 21/418* (2011.01)
*G06Q 20/12* (2012.01)

(52) U.S. Cl.
CPC .............. *G07F 17/16* (2013.01); *H04N 21/418* (2013.01); *G06Q 20/123* (2013.01)
USPC ...................... 463/42; 463/1; 463/30; 463/44

(58) Field of Classification Search
USPC ...................................... 463/1, 30, 40, 41–44
See application file for complete search history.

(56) References Cited

U.S. PATENT DOCUMENTS

| | | | |
|---|---|---|---|
| 5,662,332 A | 9/1997 | Garfield | |
| 5,854,923 A | 12/1998 | Dockter et al. | |
| 5,938,726 A | 8/1999 | Reber et al. | |
| 5,986,651 A | 11/1999 | Reber et al. | |
| 6,282,819 B1 | 9/2001 | Gu | |
| 6,292,780 B1 | 9/2001 | Doederlein et al. | |
| 6,322,077 B1 | 11/2001 | Braunlich et al. | |
| 6,371,850 B1 * | 4/2002 | Sonoda | 463/8 |
| 6,508,706 B2 * | 1/2003 | Sitrick et al. | 463/1 |
| 8,057,306 B2 * | 11/2011 | Glassman et al. | 463/42 |
| 2001/0034257 A1 | 10/2001 | Weston et al. | |
| 2001/0039206 A1 | 11/2001 | Peppel | |
| 2002/0031228 A1 | 3/2002 | Karkas et al. | |
| 2002/0038259 A1 | 3/2002 | Bergman et al. | |
| 2003/0110046 A1 | 6/2003 | Cofta | |
| 2003/0112354 A1 | 6/2003 | Ortiz et al. | |
| 2004/0068743 A1 | 4/2004 | Parry et al. | |
| 2004/0107144 A1 | 6/2004 | Short | |
| 2004/0133518 A1 | 7/2004 | Dryall | |
| 2004/0171381 A1 | 9/2004 | Inselberg | |
| 2004/0254845 A1 | 12/2004 | Dozier et al. | |

* cited by examiner

Primary Examiner — Jasson Yoo
(74) Attorney, Agent, or Firm — Haverstock & Owens LLP

(57) ABSTRACT

In one embodiment, the methods and apparatuses detect a device; detect a status level corresponding to the device; receive content on the device based on the status level; and display the content on the device based on the status level.

20 Claims, 11 Drawing Sheets

METHODS AND APPARATUSES FOR DISPLAYING INTERACTIVE CONTENT THROUGH A DEVICE

CROSS REFERENCE TO RELATED APPLICATIONS

This is a Continuation Application of U.S. patent application Ser. No. 10/803,560, filed Mar. 17, 2004, which claims benefit of U.S. Provisional patent Application No. 60/455,625 filed on Mar. 17, 2003, entitled "Interactive Trading Cards" listing the same inventors, the disclosure of which is hereby incorporated by reference.

FIELD OF THE INVENTION

The present invention relates generally to displaying content and, more particularly, to displaying interactive content through a device.

BACKGROUND

Portable static display devices have been used for many years to display content. For example, trading cards are portable items that display content. For many people, the activity of collecting trading cards has become a popular past time. These trading cards promote football, baseball, fictitious cartoon characters, action figures, and the like. The content displayed on these trading cards are typically static images or holograms printed onto the surface of the trading cards.

During the course of many years, there have been improvements to manufacturing and printing trading cards that have resulted in improved image quality and durability of the cards. Although there have been improvements to trading cards over the years, the basic premise of displaying static images through a card has remained mostly unchanged.

SUMMARY

In one embodiment, the methods and apparatuses detect a device; detect a status level corresponding to the device; receive content on the device based on the status level; and display the content on the device based on the status level.

BRIEF DESCRIPTION OF THE DRAWINGS

The accompanying drawings, which are incorporated in and constitute a part of this specification, illustrate and explain one embodiment of the methods and apparatuses for displaying dynamic content through a device. In the drawings.

DETAILED DESCRIPTION

The following detailed description of the methods and apparatuses for displaying dynamic content through a device refers to the accompanying drawings. The detailed description is not intended to limit the methods and apparatuses for displaying dynamic content through a device. Instead, the scope of the methods and apparatuses for displaying dynamic content through a device are defined by the appended claims and equivalents. Those skilled in the art will recognize that many other implementations are possible, consistent with the present invention.

References to "content" includes textual data, graphical data, video footage, digital images, audio data, and the like.

In one embodiment, the methods and apparatuses for displaying dynamic content through a device allows a user to interact through a convenient electronic device. In one embodiment, the user utilizes the electronic device in a manner similar to a ticket stub to gain access to an entertainment event such as a concert. In this example, the electronic device is also worn to the entertainment event like a button and is configured to display the user's selected content related to the concert. Further, the electronic device is used to wirelessly download content such as pictures, audio data, and video footage at the entertainment event for use during and after the concert. In one embodiment, video footage is streamed to the electronic device such that the electronic device displays scenes in real time that capture the performance at the concert. In one embodiment, the video footage displayed by the electronic device shows a vantage point that is unavailable to the user of the electronic device.

In another embodiment, the electronic device is utilizes as a trading card. In this embodiment, the trading card is customized by the user. During this customization, images, video footage, and other content are associated with the trading card. In another embodiment, a status level of the trading card is assigned and updated based on the outcome of the contents engaged by the particular trading card. In addition to exchanging these trading cards with different users, the trading card detects other trading cards and engages in contents against other trading cards. During various stages of these contests, different content is displayed on the trading card. In one embodiment, by winning the contest, the trading card is assigned a higher status level.

Figure 1:
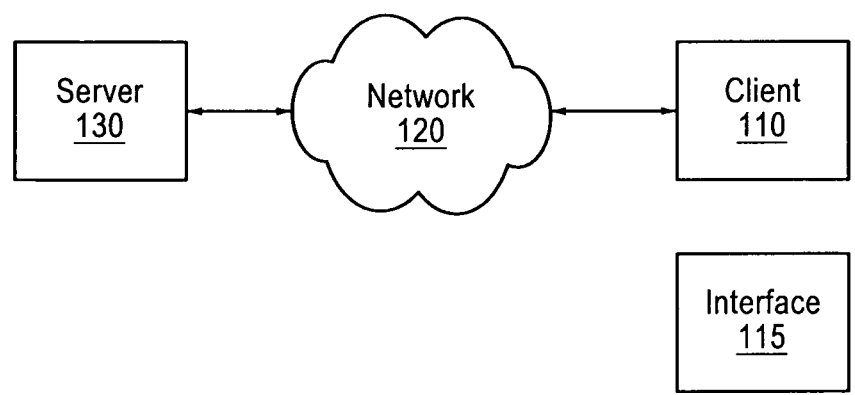
FIG. 1 is a diagram illustrating an environment within which the methods and apparatuses for displaying dynamic content through a device are implemented.

FIG. 1 is a diagram illustrating an environment within which the methods and apparatuses for displaying dynamic content through a device are implemented. The environment includes an electronic device 110 (e.g., a computing platform configured to act as a client device, such as a flexible card made of plastic, cardboard, metal, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces such as a display and speakers in the same housing. In one embodiment, the user utilizes interface 115 to access and control content and applications stored in electronic device 110, server 130, or a remote storage device (not shown) coupled via network 120.

In accordance with the invention, embodiments of displaying dynamic content through a device below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
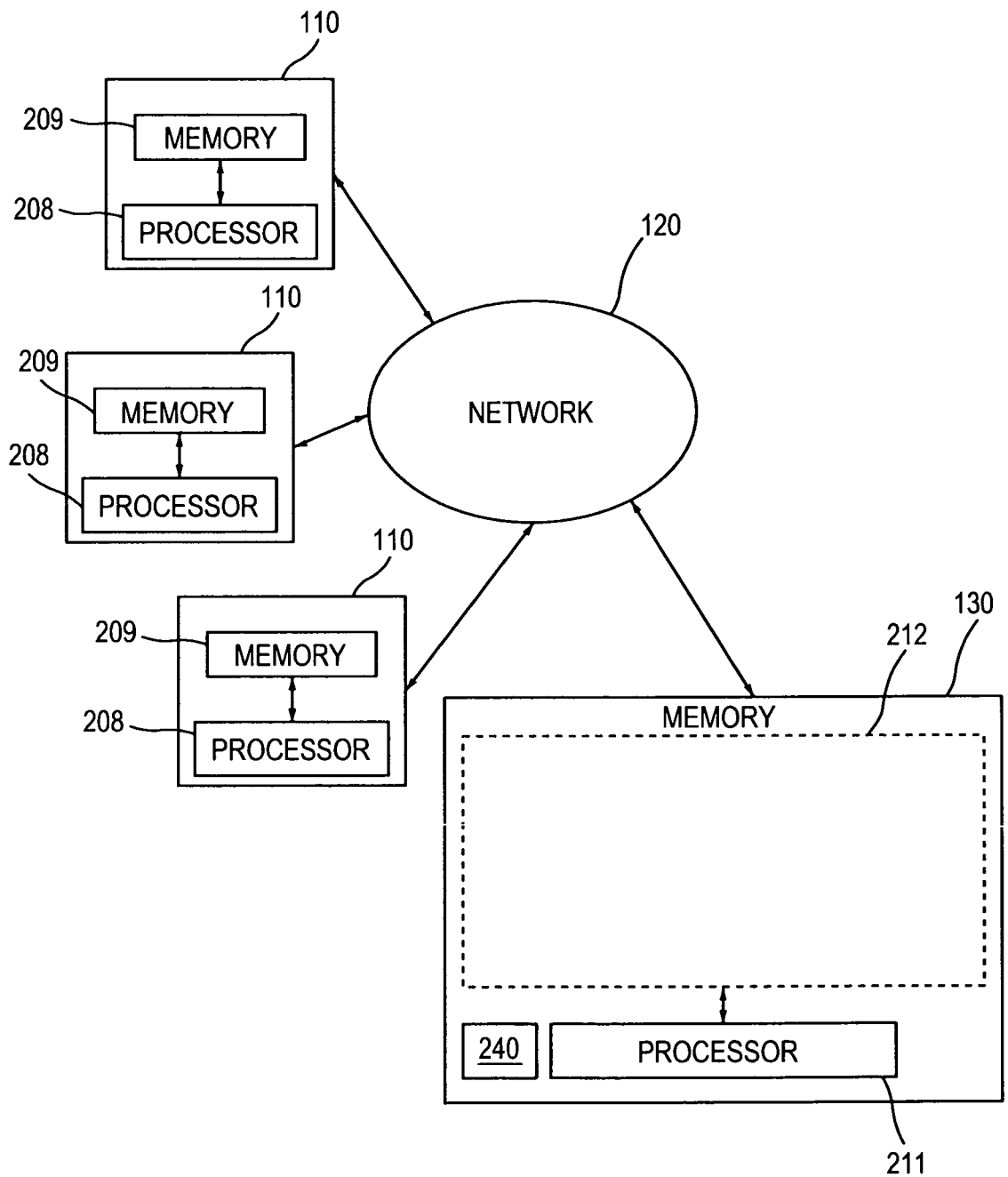
FIG. 2 is a simplified block diagram illustrating one embodiment in which the methods and apparatuses for displaying dynamic content through a device are implemented.

FIG. 2 is a simplified diagram illustrating an exemplary architecture in which the methods and apparatuses for displaying dynamic content through a device are implemented.

The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. In one embodiment, a unique user operates each electronic device 110 via an interface 115 as described with reference to FIG. 1.

The server device 130 includes a processor 211 coupled to a computer-readable medium 212. In one embodiment, the server device 130 is coupled to one or more additional external or internal devices, such as, without limitation, a secondary data storage element, such as database 240.

In one embodiment, the plurality of client devices 110 and the server 130 include instructions for a customized application for displaying dynamic content through a device. In one embodiment, the plurality of computer-readable media 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in media 209, in media 212, or a single user application is stored in part in one media 209 and in part in media 212. In one instance, a stored user application, regardless of storage location, is made customizable based on capturing and storing content related to an event as determined using embodiments described below.

Figure 3:
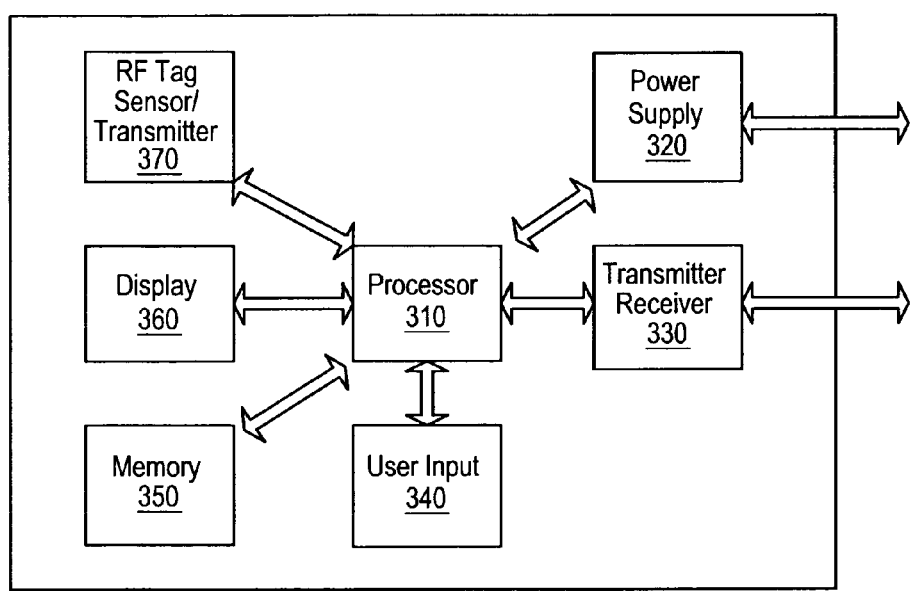
FIG. 3 is a simplified block diagram illustrating a system, consistent with one embodiment of the methods and apparatuses for displaying dynamic content through a device.

FIG. 3 is a simplified diagram illustrating an exemplary architecture of the electronic device 110 in which the methods and apparatuses for displaying dynamic content through a device are implemented.

In one embodiment, the electronic device 110 is composed of a flexible material such as plastic, metal, and the like. In one embodiment, the electronic device 110 is configured as a ticket or a badge to gain access to an entertainment event such as a concert or sporting event. In another embodiment, the electronic device 110 is configured to be worn as a decorative button to display different content. In yet another embodiment, the electronic device 110 is a trading card to be traded among users, to selectively display content, and to participate in contests against other trading cards.

In one embodiment, the electronic device 110 includes a processor 310, a power supply 320, a transmitter/receiver 330, a user input 340, memory 350, a display 360, and an RF tag sensor/transmitter 370. In one embodiment, the processor 310 communicates with the power supply 320, the transmitter/receiver 330, the user input 340, the memory 350, the display 360, and the RF tag sensor/transmitter 370.

In one embodiment, the power supply 320 supplies electrical power to the electronic device 110. In one embodiment, the power supply 320 is a rechargeable battery utilizing technologies such as a lithium ion, lithium polymer and the like. In one embodiment, the power supply 320 is recharged from outside the electronic device 110 through an electrical connection with the electronic device 110. In another embodiment, the power supply 320 also acts as a port to connect to other devices. In yet another embodiment, the power supply 320 is recharged by placing the electronic device 110 onto a charging matt which charges the power supply 320 through electromagnetic waves.

In one embodiment, the processor 310 manages the resources of the power supply 320 to conserve energy when the electronic device 110 is not in use.

In one embodiment, the transmitter/receiver 330 transmits and receives signals for use with the methods and apparatuses for displaying dynamic content through a device. In one embodiment, the signals transmitted or received by the transmitter/receiver 330 represent content. In another embodiment, the signals received by the transmitter/receiver 330 include signals that identify other devices. In another embodiment, the signals transmitted by the transmitter/receiver 330 include signals that identify the current device.

In one embodiment, the transmitter/receiver 330 communicates with other devices through a direct wireless communication such as Bluetooth, ultra-wideband, keyless entry, microwave transmission, cellular transmission, radio frequency transmission, and the like. In another embodiment, the transmitter/receiver 330 communicates with other devices through a hard-wired network connection.

In one embodiment, the user input 340 allows a user to enter information into the electronic device 110. In one embodiment, the user input 340 includes a touch screen, keys, a pointing device, and/or a microphone. For example, the user input 340 accepts instructions from the user to control the electronic device 110.

In one embodiment, the memory 350 stores data such as content, profile information for the electronic device 110, profile information for other devices, account information, and the like. In one embodiment, the memory 350 includes writable solid-state memory, magnetic media, RAM, and ROM.

In one embodiment, the display 360 provides information to the user of the electronic device 110. In one embodiment, the display supplies visual information through a graphical display such as liquid crystal display, an organic light emitting diode display, and the like. In one embodiment, the graphical display generates a color image. In another embodiment, the graphical display generates a monochrome image. In yet another embodiment, the graphical display generates an animated sequence of images.

In another embodiment, the display 360 supplies audio information through a speaker. The display 360 presents the user with the content.

Figure 5:
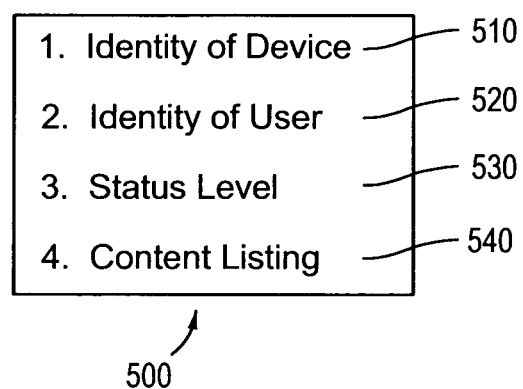
FIG. 5 illustrates an exemplary record for use with the methods and apparatuses for displaying dynamic content through a device.

In one embodiment, the RF tag sensor/transmitter 370 is utilized to broadcast profile information regarding the electronic device 110. One example of profile information is shown in FIG. 5. In one embodiment, the RF tag sensor/transmitter 370 is capable of broadcasting the profile information to other electronic devices 110 or to the server 130. For example, the RF tag sensor/transmitter 370 continues to broadcast the profile information to other devices regardless of the operation status of the electronic device 110. In another example, the processor 310 selectively instructs the RF tag sensor/transmitter 370 to broadcast the profile information.

In another embodiment, the RF tag sensor/transmitter 370 is utilized to receive broadcasted profile information from other electronic devices 110 or from the server 130.

Figure 4:
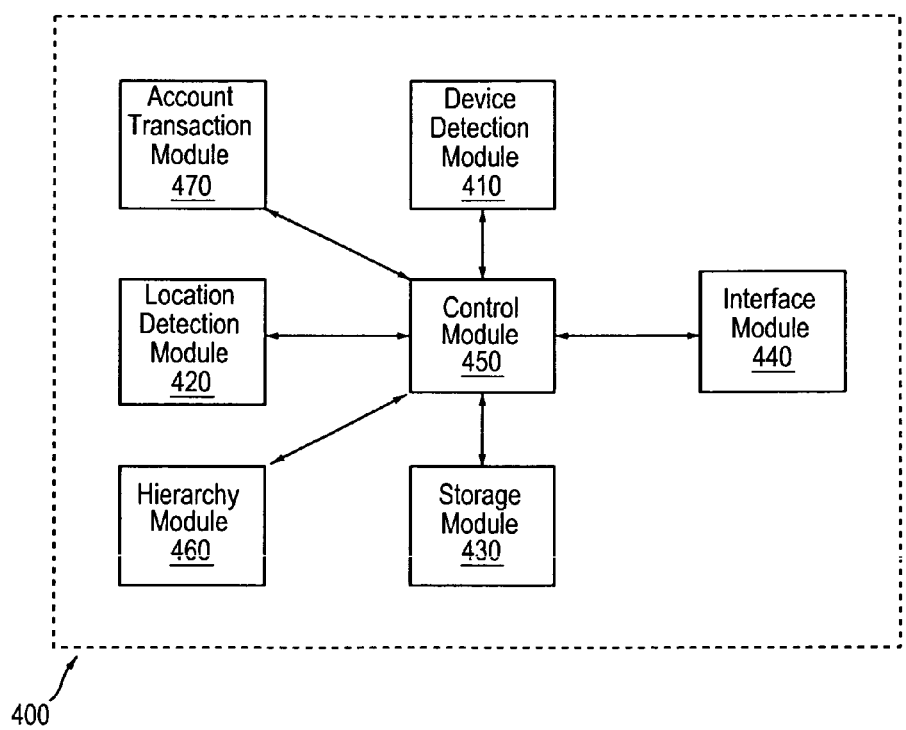
FIG. 4 is a simplified block diagram illustrating a system, consistent with one embodiment of the methods and apparatuses for displaying dynamic content through a device.

FIG. 4 illustrates one embodiment of a system 400. In one embodiment, the system 400 is embodied within the server 130. In another embodiment, the system 400 is embodied within the electronic device 110. In yet another embodiment, the system 400 is embodied within both the electronic device 110 and the server 130.

In one embodiment, the system 400 includes a device detection module 410, a location detection module 420, a storage module 430, an interface module 440, a control module 450, a hierarchy module 360, and an account transaction module 470.

In one embodiment, the control module 450 communicates with the device detection module 410, the location detection module 420, the storage module 430, the interface module 440, the hierarchy module 460, and the account transaction module 470. In one embodiment, the control module 450 coordinates tasks, requests, and communications between the device detection module 410, the location detection module 420, the storage module 430, the interface module 440, the hierarchy module 460, and the account transaction module 470.

In one embodiment, the device detection module 410 detects the identity the device. For example, each device is identified by a unique identifier such as a serial number. By uniquely identifying the device, a user corresponding to the specific device is also identified in one embodiment. For example, in the case where a unique user is registered with each unique device, the user is identified when the device is identified. In another example, where multiple users are associated with each unique device, a password is utilized to identify the current user of the device.

In one embodiment, the device detection module 410 operates through transmission of the profile information through the RF tag sensor/transmitter 370. In one embodiment, the profile information includes a serial number that identifies the particular device. In another embodiment, the profile information includes a password that uniquely identifies the device and the user of the device.

In one embodiment, by identifying the device and/or the user of the device, the device detection module 410 utilizes additional information associated with the particular device and/or user. Additional information corresponding with the particular device and/or user is shown in an exemplary record illustrated in FIG. 5. In one embodiment, this additional information is utilized by the system 400.

In one embodiment, the location detection module 420 determines the location of the device as detected in the Block 410. In one embodiment, the location detection module 420 utilizes a global positional system (GPS) via multiple satellites to identify the location of the device. In another embodiment, the location detection module 420 utilizes a cellular network to identify the location of the device. In yet another embodiment, the location detection module 420 utilizes at least one local sensor to detect the location of the device. In yet another embodiment, the location detection module 420 utilizes at least one other device to detect the location of the device.

In one embodiment, the location detection module 420 accurately detects the location of a device within one foot. In another embodiment, the location detection module 420 accurately detects the location of a device within a mile.

In one embodiment, the storage module 430 stores a record including profile information associated with a particular device. In another embodiment, the storage module 430 stores a record including information associated with a particular user. An exemplary embodiment of the information contained within the record associated with a user or device is illustrated in FIG. 5.

In one embodiment, the interface module 440 receives a signal from one of the electronic devices 110 indicating the identity of the device or user. In another embodiment, the interface module 440 receives a signal from one of the electronic devices 110 indicating the location of the device. In yet another embodiment, the interface module 440 transmits information such as the location of another device, the identity of another device, or content to one of the electronic devices 110.

In one embodiment, the hierarchy module 460 tracks the level of status of the corresponding device or user. For example, at some concerts there are different levels of seating options. In this example, some tickets entitle the ticket holders to obtain premium seating compared to other tickets. In one embodiment, the hierarchy module 460 tracks the different features that correspond with the different status levels. In another embodiment, the hierarchy module 460 also tracks the status levels of other nearby devices or users.

In one embodiment, the status level of a particular device or user is stored within the profile information as illustrated in the FIG. 5.

In one embodiment, the account transaction module 470 allows the user of the electronic device 110 to purchase products or services. For example, in one embodiment, the account transaction module 470 allows the user to increase the user's status level. In another example, the account transaction module 470 allows the user to purchase content such as music, books, and the like.

The system 400 in FIG. 4 is shown for exemplary purposes and is merely one embodiment of the methods and apparatuses for displaying dynamic content through a device. Additional modules may be added to the system 400 without departing from the scope of the methods and apparatuses for displaying dynamic content through a device. Similarly, modules may be combined or deleted without departing from the scope of the methods and apparatuses for displaying dynamic content through a device.

FIG. 5 illustrates an exemplary record 500 identifying the profile information corresponding to a particular user or device for use with the methods and apparatuses for displaying dynamic content through a device. In one embodiment, there are multiple records such that each record 500 is associated with a particular user or device. In one embodiment, the record 500 includes an identity of the device field 510, an identity of the user field 520, a status level field 530, and a content listing field 540.

In one embodiment, the identity of the device field 510 uniquely identifies the device. In one example, a unique identification number is utilized to identify the particular device.

In one embodiment, the identity of the user field 520 uniquely identifies the participant. In one example, a password is utilized to identify the particular user.

In one embodiment, the same device is utilized by multiple users. Accordingly, the identity of the user field 520 distinguishes between multiple users utilizing the same device.

In another embodiment, each unique device is utilized by a single user. In one example, the identity of the device is sufficient to identify the participant, and the identity of the user field 520 is not necessary. In another example, the identity of the user is sufficient to identify the user, and the identity of the device field 510 is not necessary.

In one embodiment, the status level field 530 identifies the status level for the corresponding user or electronic device. In one embodiment, the status level is utilized to rank multiple users or electronic devices. In another embodiment, the status level is utilized to provide different services or products based on the status level of the user or electronic device. In one embodiment, the status level field 530 is utilized by the hierarchy module 460.

In one embodiment, the content listing field 540 identifies the content that is controlled by the corresponding user or electronic device. For example, if a user purchased music content that is stored within the electronic device 110, the content listing field 540 associated with the particular user lists this music content. In another example, if the user whom purchased this music content is the sole user associated with a particular electronic device, then the content listing field 540 associated with this particular electronic device lists this music content.

Figure 6:
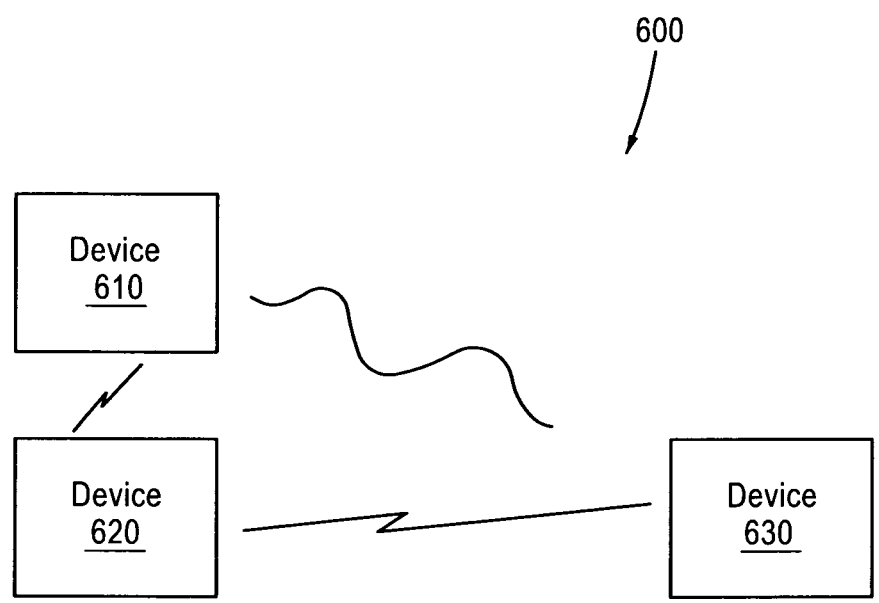
FIG. 6 is a diagram illustrating an environment within which the methods and apparatuses for displaying dynamic content through a device are implemented.

FIG. 6 illustrates one embodiment of a system 600 for displaying dynamic content through a device. The system 600 includes a device 610, a device 620, and a device 630. In one embodiment, the devices 610, 620, and 630 are representative of the electronic device 110.

In one embodiment, the devices 610, 620, and 630 communicate with each other via a wireless network. In one embodiment, the device 610 detects the presence of the devices 620 and 630. In one embodiment, the device 610 interacts with the device 620 due to the close proximity of the device 620. The device 610, however, does not interact with the device 630, because the device 630 is too far away.

In another embodiment, the devices 610, 620, and 630 compare the status levels between the devices 610, 620, and 630. In this embodiment, the status levels of the devices 610, 620, and 630 determine the type of interaction between the devices.

In yet another embodiment, the devices 610, 620, and 630 exchange content with each other. In yet another embodiment, the devices 610, 620, and 630 exchange profile information with each other.

Figure 7:
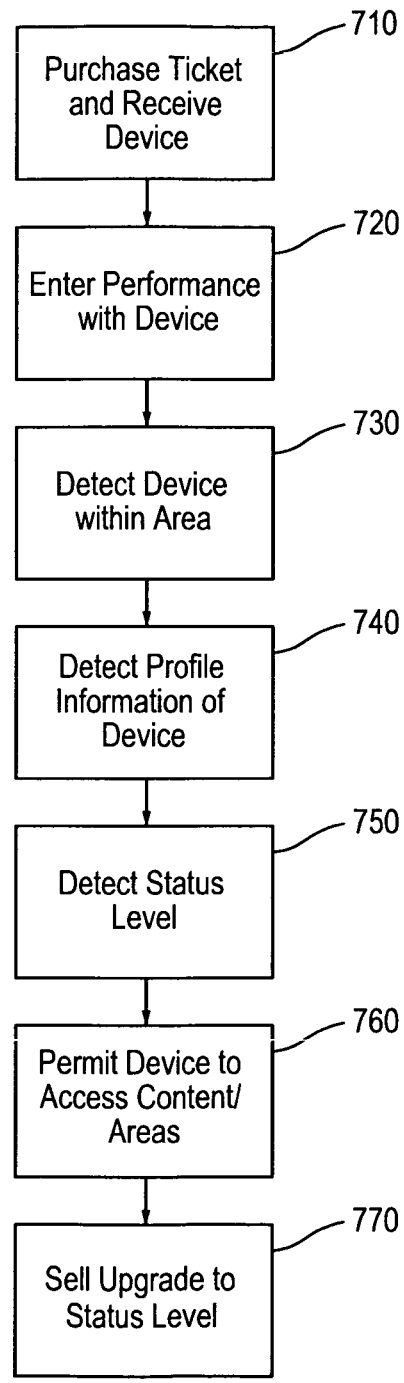
FIG. 7 is a flow diagram consistent with one embodiment of the methods and apparatuses for displaying dynamic content through a device.
Figure 8:
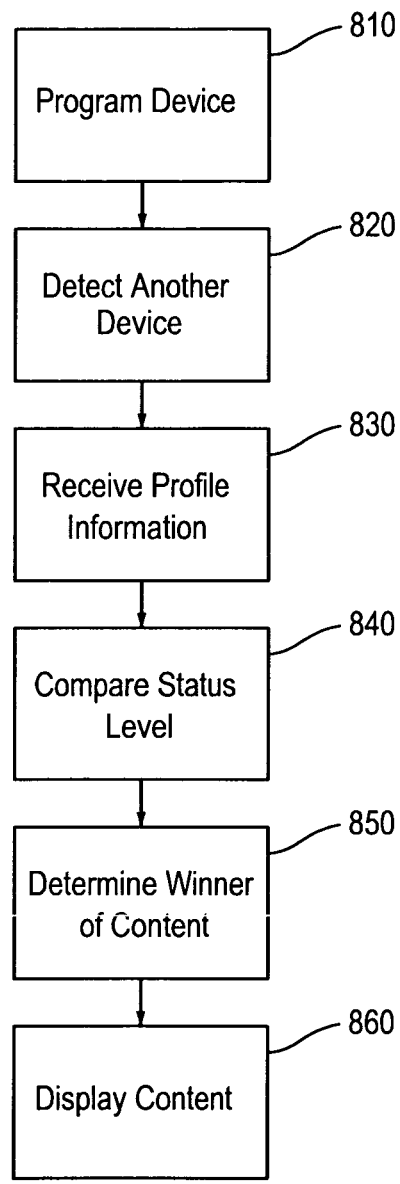
FIG. 8 is a flow diagram consistent with one embodiment of the methods and apparatuses for displaying dynamic content through a device.

The flow diagrams as depicted in FIGS. 7 and 8 are one embodiment of the methods and apparatuses for displaying dynamic content through a device. The blocks within the flow diagrams can be performed in a different sequence without departing from the spirit of the methods and apparatuses for displaying dynamic content through a device. Further, blocks can be deleted, added, or combined without departing from the spirit of the methods and apparatuses for displaying dynamic content through a device.

The flow diagram in FIG. 7 illustrates an exemplary application of the methods and apparatuses for displaying dynamic content through a device. This exemplary application illustrates utilizing the electronic device as a ticket stub to gain entrance to an entertainment event, as an enhancing device for use during the entertainment event, as a keepsake item to remember the entertainment event, and as a badge or button that expresses the user's individuality and status to others.

In Block 710, a ticket for an entertainment event is purchased by a user, and the electronic device is received by the user. In one embodiment, the electronic device is shaped as a flexible, thin card. In another embodiment, the electronic device is configured to be worn like a badge.

In one embodiment, the entertainment event is a concert. In another embodiment, the entertainment event is any entertainment event such as a sporting event, trip to a theme park, and the like.

In Block 720, the user enters the entertainment event with the electronic device. In one embodiment, the electronic device serves as an entrance ticket to the entertainment event. For example, sensors at the entertainment event are utilized to ensure that only users with tickets are allowed to enter the entertainment event. Similarly, sensors at the entertainment event that detect the electronic device also control access to restricted areas such as back stage and premium seating.

In Block 730, the electronic device is detected. In one embodiment, the electronic device is detected within the entertainment event venue. For example, a sensor near the entrance to the venue detects the presence of the electronic device. In another example, a network of sensors detects the location of the electronic device within the venue.

In another embodiment, the electronic device is detected outside of the entertainment venue. In this embodiment, the electronic device is detected at a predetermined area outside of the venue, and the electronic device receives directions to lead the user of the electronic device to the entrance to the venue.

In yet another embodiment, the electronic device detects another electronic device within a predetermined area.

In Block 740, the profile information associated with the user is detected. In one embodiment, the profile information is stored within the storage module 430. An exemplary record showing the profile information is included in FIG. 5. In one embodiment, the profile information is detected by a sensor. In another embodiment, the profile information is detected by a server 130. In yet another embodiment, the profile information is detected by another electronic device 110.

In one embodiment, the profile information is initially programmed into the electronic device at the time the ticket was purchased in the Block 710.

In Block 750, the status level of the user is detected. In one embodiment, the status level is part of the information profile. In one embodiment, there are multiple status levels for tickets to the same entertainment event. For example, some tickets are purchased with preferred or premium seating. In another example, some tickets entitle the ticket holder to enter the back stage area. In yet another example, some tickets allow the ticket holder to access additional content. In one embodiment, a higher status level is obtained by purchasing a more costly ticket for the entertainment event.

In Block 760, the electronic device is permitted to access content and areas. In one embodiment, content is transmitted to the electronic device. In one embodiment, the content originated from the server 130 and is received wirelessly by the electronic device. In one embodiment, the content includes audio tracks corresponding to the entertainment event, video footage of the entertainment event shown in real time, images of the performers of the entertainment event, and the like.

In one embodiment, viewing video footage of the entertainment event in real time is valuable when the user is not able to view the entertainment event at an ideal point of view or distance from the stage.

In one embodiment, the user of the electronic device is able to customize the electronic device by selecting different animated graphics that are displayed by the electronic device. In one example, the electronic device continues to display content after the event is over and becomes a memento of the entertainment event for the user.

In one embodiment, the electronic device becomes a collector's item that contains content that is unique to the particular entertainment event. For example, the electronic device that displays content unique to a particular entertainment event is worn like a button to other entertainment events to show that the user is a faithful fan.

In one embodiment, the electronic device displays content that correlates to the status level of the particular electronic device. For example, an electronic device that has a higher status level displays a graphic that distinguishes the electronic device from devices of a lower status level.

In one embodiment, different status levels for the electronic devices allow different content to be offered depending on the status level. For example, better content such as the video footage of the entertainment event in real time is earmarked for devices with a higher status level in one embodiment. In another embodiment, all electronic devices are capable of receiving the standard content. However, only electronic devices of a higher status level are capable of receiving the premium content. For example, the standard content includes 2 songs corresponding to the entertainment event; and the premium content includes an additional 2 songs corresponding to the event.

In another example, a set of standard graphics are available to all electronic devices. However, a set of premium graphics are only available to electronic devices having a higher status level. In this example, these graphics are chosen by the user for display on the electronic device, and the difference in the premium graphics compared to the standard graphics give the devices from different status levels a unique look.

In one embodiment, the status level of the electronic device determines access of different areas during the entertainment event. For example, electronic devices with a higher status level are permitted to enter the back stage area whereas an electronic device with a lower status level is not allowed in the back stage area. In this example, the electronic device with the higher status level acts as a key to enter restricted areas.

In one embodiment, the electronic device communicates with other electronic devices within the immediate area of the electronic device. The electronic devices exchange messages and content with each other.

In Block 770, the user of the electronic device is offered an opportunity to upgrade the status level of the device subsequent to purchasing the ticket for the entertainment event. In one embodiment, the user initially purchased a basic ticket with a lower status level. However, once participating in the entertainment event and noticing others having the benefits of a higher status level, the user wishes to purchase an upgrade to a higher status level.

In one embodiment, the user is able to purchase the higher status level through the account transaction module 470 through the electronic device. In one embodiment, the user is not able to purchase a higher status level when the allocated number of higher status level tickets are exhausted.

In use, the promoters of the entertainment events are able to control the content that is distributed to the attendees of the entertainment events through the electronic devices.

The flow diagram in FIG. 8 illustrates an exemplary application of the methods and apparatuses for displaying dynamic content through a device. This exemplary application illustrates utilizing the electronic device as a dynamic action card to trade with among other users and to play contests against other actions cards.

In Block 810, the electronic device is programmed. In one embodiment, the electronic device represents a customizable action character for use by a user. In one embodiment, the profile information is programmed into the electronic device. By programming the profile information into the electronic device, the user is able to set the status level for the particular electronic device. Further, the user is able to program animated graphics for the particular electronic device that represents the action character at different times such as when the action character is engaged in a contest with other characters, when the action character wins the content, and when the action character is defeated in the content. In another embodiment, the user programs personalized sounds that are played back on the electronic device. These personalized sounds include the user's voice, sound clips, and the like.

In Block 820, the electronic device detects another electronic device. In one embodiment, the proximity of another electronic device with a predetermined area of the electronic device is detected through the device location module 420.

In Block 830, the electronic device receives the profile information of the detected electronic device that was detected in the Block 820.

In Block 840, the status levels between the electronic device and the detected electronic device are compared. In one embodiment, the status levels are compared when there is a contest between the electronic device and the detected electronic device.

In Block 850, a winner of the contest between the electronic device and the detected electronic device is determined. In one embodiment, the device with the higher status level wins the contest. In one embodiment, if the status levels between the electronic device and the detected electronic device are the same, then the winner is randomly chosen. In one example, a random number generator produces a number that randomly selects the winner of the contest.

In one embodiment, the winner of the contest has the status level of the corresponding device increased. In one embodiment, the winning device with an increased status level is associated with an action character that becomes stronger and is able to add additional features such as weapons and tools for use by the action character.

Similarly, the loser of the contest has the status level of the corresponding device decreased. As the losing device has a decreasing status level, an action character associated with the losing device becomes weaker and may lose weapons and tools that currently belong to the action character. In one embodiment, when a device loses too many contests, this device needs to be reprogrammed with additional points to increase the device's status level. In another embodiment, as the device loses contests, the battery level or power level of the device decreases and necessitates a re-charging of the power supply.

In Block 860, content is selectively displayed on the electronic device. In one embodiment, the content is chosen to be displayed on the electronic device based on the current operation of the device. For example, different content is displayed for different operations of the devices such as engaged in a contest with another device, detecting another device, winning the contest, losing the contest, and the like.

In one embodiment, the content displayed on two devices that are engaged in a contest is synchronized. In one embodiment, the synchronization allows the content on each device appear to be a single continuous content spread across both devices. In one embodiment, the synchronization is accomplished via a communication between both devices. Further, when at least one device is detected nearby each another device, these devices act in concert with each other to display content based on the location of the devices. For example, in the case with multiple devices, one device represents an action character and another device represents an object utilized by the action character such as a weapon or a tool.

In one embodiment, the image that represents the action character associated with the electronic device is displayed on the electronic device. As the action character gains or loses status level, the image of the action character changes. In one embodiment, the electronic device continues to display the image that represents the action character when the electronic device is in a "stand-by" or off mode.

Figure 9:
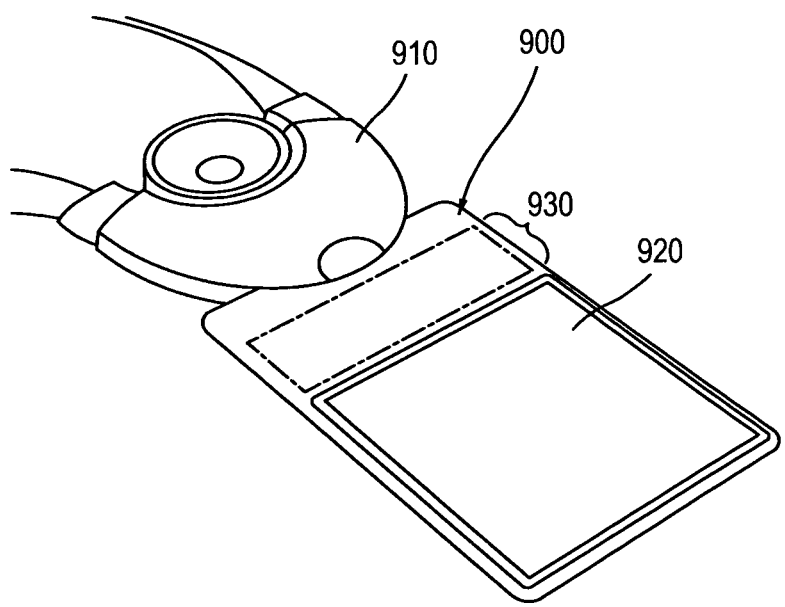
FIG. 9 illustrates an exemplary device consistent with one embodiment of the methods and apparatuses for displaying dynamic content through a device.

FIG. 9 is an exemplary embodiment of a ticket stub 900 for an entertainment event. The ticket stub 900 is one embodiment of the electronic device 110. A strap 910 is shown coupled to the ticket stub 900 that allows the ticket stub 900 to also be worn by a user like a badge or button. In one embodiment, the ticket stub 900 includes a text portion 930 that displays textual information such as the profile information and entertainment event information. In one embodiment, the ticket stub 900 also includes a display 920 to show content that is contained within the ticket stub 900 or streamed to the ticket stub 900. In another embodiment, the display 920 is also a touch screen that allows the user to provide input to the ticket stub 900.

Figure 10:
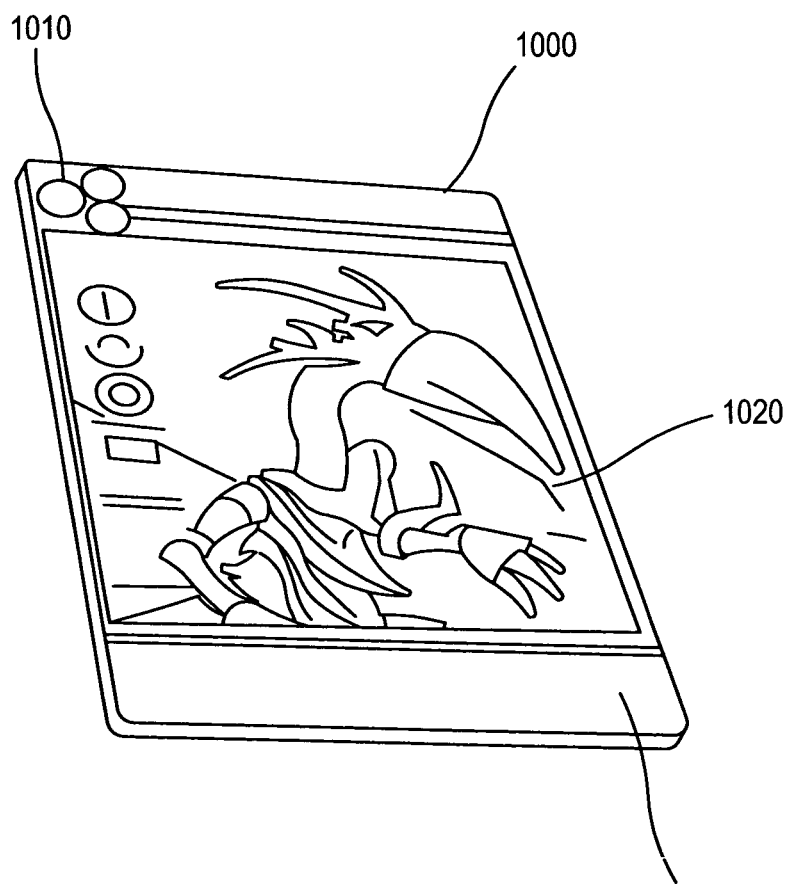
FIG. 10 illustrates an exemplary device consistent with one embodiment of the methods and apparatuses for displaying dynamic content through a device.

FIG. 10 is an exemplary embodiment of a trading card 1000. The trading card 1000 is one embodiment of the electronic device 110. In one embodiment, the trading card 1000 includes a user input area 1010 that allows the user to interact with the trading card 1000. In one embodiment, the trading card 1000 includes a display area 1020 that allows the user to view the content. In one embodiment, the trading card 1000 includes a text portion 1030 that displays textual information such as the profile information.

Figure 11:
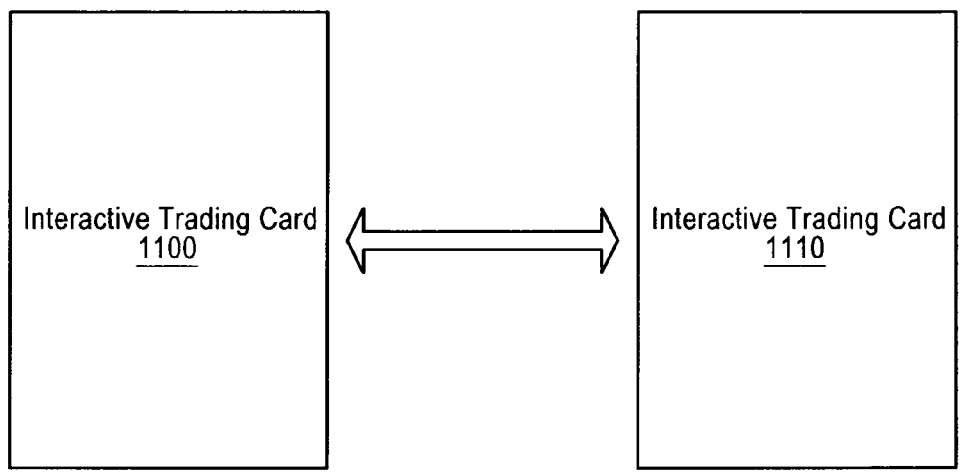
FIG. 11 illustrates exemplary devices consistent with one embodiment of the methods and apparatuses for displaying dynamic content through a device.

FIG. 11 is an exemplary embodiment of multiple trading cards interacting with each other as shown in the flow diagram in FIG. 8. Trading cards 1100 and 1110 are one embodiment of the electronic device 110. In one embodiment, the trading cards 1100 and 1110 include a user input area, a display area, and a text portion as shown in the trading card 1000.

In one embodiment, the trading cards 1100 and 1110 communicate with each other. For example, the trading cards 1100 and 1110 detect the location of each other. When the trading cards 1100 and 1110 are located within a predetermined range of each other, the trading cards 1100 and 1110 are capable of entering into a contest with each other. As one example of a contest, the trading cards 1100 and 1110 have a fake battle with each other.

In operation, the trading cards 1100 and 1110 communicate with each other to display the appropriate content when required. For example, when the trading cards 1100 and 1110 enter into the fake battle with each other, the trading cards 1100 and 1110 signal each other that a battle animation is displayed on each respective trading card. Further, the trading cards 1100 and 1110 communicate with each other to correctly synchronize the timing for the display of the content. For example, both trading cards 1100 and 1110 display the battle animation at approximately the same time.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A non-transitory computer readable medium storing a computer program for displaying synchronized contests involving characters associated with portable devices, the computer program executable by a processor to perform operations comprising:
    associating with a first portable device a first character having a first status level;
    detecting a second portable device within a proximity of the first portable device, a second character having a second status level being associated with the second portable device;
    comparing the first status level with the second status level; and
    displaying on the first portable device an animated graphical display of a contest between the first and second characters, wherein the animated graphical display of the contest is displayed as a synchronized single continuous event on both the first portable device and the second portable device, with an outcome of the contest being determined based upon the comparison of the first and second status levels, wherein the first portable device and the second portable device function together to display different but related content based on the location of the devices.

2. The non-transitory computer readable medium of claim 1, wherein the synchronized graphical display is separately displayable on the second portable device while it is being displayed on the first portable device.

3. The non-transitory computer readable medium of claim 1, wherein a winner of the contest is shown in the synchronized graphical display, the winner being based upon the comparison of the first and second status levels.

4. The non-transitory computer readable medium of claim 1, wherein the first status level is adjusted based upon the outcome of the contest.

5. The non-transitory computer readable medium of claim 1, wherein a hierarchy module establishes the first status level.

6. The non-transitory computer readable medium of claim 1, wherein a wireless tag module respectively transmits and receives profile information corresponding to the first and second devices, the profile information accommodating association of the first and second characters with the first and second devices.

7. An apparatus for displaying synchronized contests involving characters associated with portable devices, the system comprising:
    a processing unit; and
    a memory, the memory storing program code executable by the processing unit to perform operations comprising:
    associating with a first portable device a first character having a first status level;
    detecting a second portable device within a proximity of the first portable device, a second character having a second status level being associated with the second portable device;
    comparing the first status level with the second status level; and
    displaying on the first portable device an animated graphical display of a contest between the first and second characters, wherein the animated graphical display of the contest is displayed as a synchronized single continuous event on both the first portable device and the second portable device, with an outcome of the contest being determined based upon the comparison of the first and second status levels, wherein the first portable device and the second portable device function together to display different but related content based on the location of the devices.

8. The apparatus of claim 7, wherein the synchronized graphical display is separately displayable on the second portable device while it is being displayed on the first portable device.

9. The apparatus of claim 7, wherein a winner of the contest is shown in the synchronized graphical display, the winner being based upon the comparison of the first and second status levels.

10. The apparatus of claim 7, wherein the first status level is adjusted based upon the outcome of the contest.

11. The apparatus of claim 7, wherein a hierarchy module establishes the first status level.

12. The apparatus of claim 7, wherein a wireless tag module respectively transmits and receives profile information corresponding to the first and second devices, the profile information accommodating association of the first and second characters with the first and second devices.

13. An apparatus for displaying synchronized contests involving characters associated with portable devices, the apparatus comprising:
   means for associating with a first portable device a first character having a first status level;
   means for detecting a second portable device within a proximity of the first portable device, a second character having a second status level being associated with the second portable device;
   means for comparing the first status level with the second status level, with an outcome of the contest being determined based upon the comparison of the first and second status levels; and
   means for displaying an animated graphical display of a contest between the first and second characters on the first portable device, the animated graphical display of the contest being displayable as a synchronized single continuous event on both the first portable device and the second portable device, wherein the first portable device and the second portable device function together to display different but related content based on the location of the devices.

14. The apparatus of claim 13, wherein the synchronized graphical display is separately displayable on the second portable device while it is being displayed on the first portable device.

15. The apparatus of claim 13, wherein a winner of the contest is shown in the synchronized graphical display, the winner being based upon the comparison of the first and second status levels.

16. The apparatus of claim 13, wherein the first status level is adjusted based upon the outcome of the contest.

17. The apparatus of claim 13, wherein a hierarchy module establishes the first status level.

18. The apparatus of claim 13, wherein a wireless tag module respectively transmits and receives profile information corresponding to the first and second devices, the profile information accommodating association of the first and second characters with the first and second devices.

19. A non-transitory computer readable medium storing a computer program for displaying synchronized contests involving characters associated with portable devices, the computer program executable by a processor to perform operations comprising:
   associating with a first portable device a first character;
   detecting a second portable device within a proximity of the first portable device, a second character being associated with the second portable device;
   displaying on the first portable device an animated graphical display of a contest between the first and second characters upon the proximity detection of the second portable device, wherein the animated graphical display of the contest is displayed as a synchronized single continuous event on both the first portable device and the second portable device, wherein as a contest is lost on a device, a battery level of the device decreases and necessitates a re-charging of a battery associated with the device.

20. A method for displaying synchronized contests involving characters associated with portable devices, the method comprising:
   associating with a first portable device a first character;
   detecting a second portable device within a proximity of the first portable device, a second character being associated with the second portable device;
   displaying on the first portable device an animated graphical display of a contest between the first and second characters upon the proximity detection of the second portable device, wherein the animated graphical display of the contest is displayed as a synchronized single continuous event on both the first portable device and the second portable device, wherein as a contest is lost on a device, a battery level of the device decreases and necessitates a re-charging of a battery associated with the device.

* * * * *